March 25, 1958  O. A. ANTRAM  2,828,101
PNEUMATIC VALVE
Filed July 20, 1955
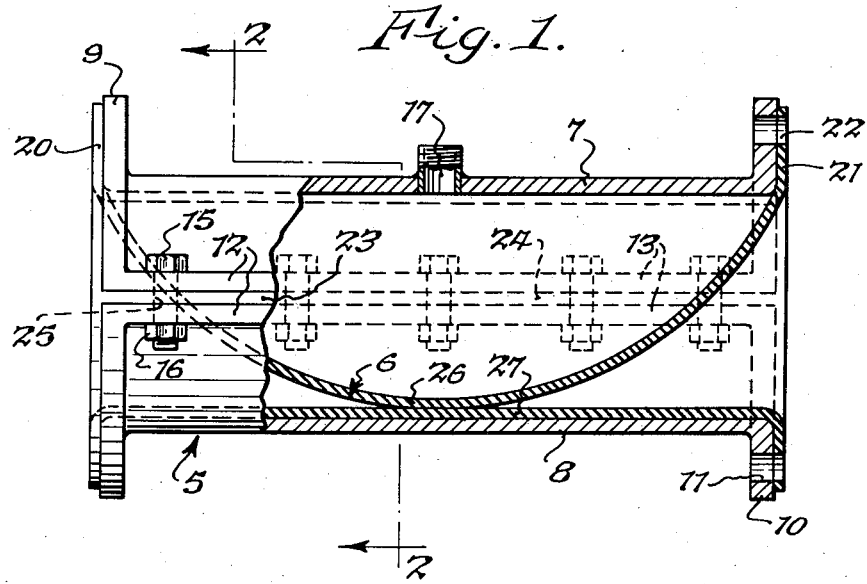
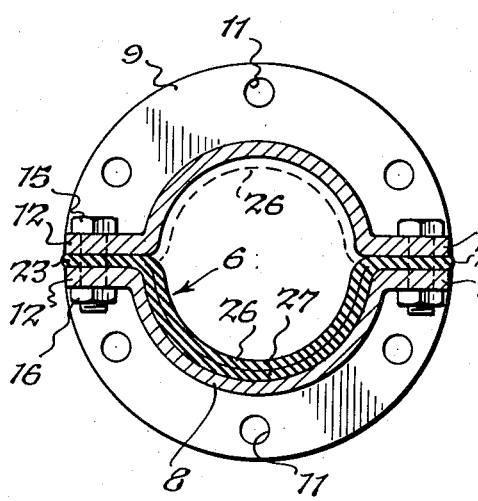 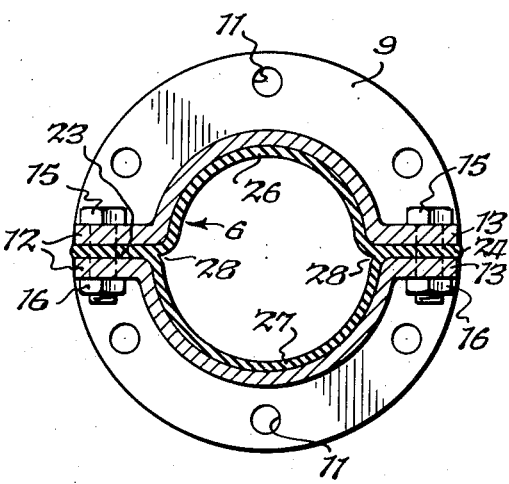
INVENTOR.
Orville A. Antram
BY
R. W. Brunell
Attorneys.

United States Patent Office 2,828,101
Patented Mar. 25, 1958

2,828,101

PNEUMATIC VALVE

Orville A. Antram, Lewiston, N. Y.

Application July 20, 1955, Serial No. 523,308

2 Claims. (Cl. 251—5)

This invention relates to valves, and more particularly to valves designed primarily for control of the flow of granular solids and/or fluid materials which may be under pressure or gravity flow. It is especially concerned with valves of the pneumatic type wherein a section of flexible tubing is encased in a surrounding rigid housing and can be partially or wholly closed off against the flow of granular or powdered solids and/or fluids therethrough by the application of hydraulic or pneumatic pressure against the outside of the flexible tubing to force the sides thereof together.

It is an object of the invention to provide an improved valve of the aforesaid described type that can be effectively opened and closed, with no moving mechanical parts in the conduit area, that eliminates the need for valve stem packing, and that is highly suitably for the handling of corrosive and/or erosive materials.

It is a further object to provide a valve of the described type that can be adapted to be operated efficiently from a point remote from the valve, thereby providing, where desired, an added safety factor as well as opportunity for a centralized control.

It is also an object to provide a valve which, when used in conjunction with suitable pulsating equipment, is adapted to use for the controlled flow and/or discharge of thixotropic colloids and like materials which must be agitated to prevent setting up or solidifying in transit.

These and other objects and advantages accruing from the invention will become apparent as the description proceeds.

In order that the invention may be more clearly understood, reference is made to the drawings, in which:

Figure 1 is a side elevational view, partially in section, of a pneumatic valve embodying the structural and functional features of the present invention, showing the valve in its closed position;

Figure 2 is a sectional view through the line 2—2 of Figure 1; and

Figure 3 is a view similar to that of Figure 2, showing the same valve when the hydraulic or pneumatic pressure upon the valve lining is released and the valve is completely open to the flow of materials therethrough.

Referring further to Figures 1, 2 and 3 of the drawing, the valve of the herein-described and depicted type comprises a generally tubular, rigid cylindrical housing 5 encasing an inner flexible, generally tubular lining 6. The housing 5 can be of iron, steel, aluminum, glass, or any other structural material strong enough to stand the required pressures. The housing is constructed of two semi-cylindrical sections 7 and 8, each of which is flanged outwardly on each end with flanges 9 and 10 provided with holes 11 drilled suitably for mounting the valve housing in line with standard flanged piping or fittings of matching diameter.

The housing sections 7 and 8 are also flanged longitudinally to provide two outwardly extending lengthwise flanges 12 and 13 drilled with holes through which the two sections are assembled and secured together by a series of bolts 15 and nuts 16. Housing section 7 is further provided with a threaded inlet fitting 17 for introducing the water, oil, compressed air or other compression element into the compression chamber or space between the housing section 7 and its inner elastic lining 6.

The flexible inner lining 6 is preferably of one piece integrally molded construction the nature of which is to return to its open, generally tubular shape when the force of the compression element is removed. The lining element can be made of any material having suitable flexible and elastic qualities and acceptable impermeability to liquids and gases, such as natural or synthetic rubbers or elastomers, or the newer elastic plastics. For example, in the handling of oil-based or other materials which tend to attack natural rubber, a suitable compounded polychloroprene lining can be used.

As in the case of the housing 5, the lining member 6 is outwardly flared or provided with flanged end portions 20 and 21 with mounting holes 22 positioned for mounting in alignment with holes 11 of the housing end flanges. The inner lining member is also provided with two diametrically opposed, outwardly extending longitudinal flanges 23 and 24 running lengthwise of the lining member and provided with a series of mounting holes 25 positioned for alignment with holes of the housing flanges 12 and 13.

The flanges 23 and 24 divide the lining member into two semi-cylindrical sections 26 and 27, and in the specific valve structure shown in the drawing, the lining is molded to provide when the valve is in normal open position two reverse curves 28 diametrically opposite each other and extending lengthwise of the lining in line with the two lengthwise flanges of the lining. A further feature is the design of the lining so that the section 26 of the lining which is the collapsible section is slightly less in diameter than the diameter of section 27 of the lining. As a result when section 26 is collapsed by outside compression and forced against stationary section 27 to close the valve, as shown most clearly in detail in Figure 2 of the drawing, due to this difference in diameters between the two sections and the presence of the reverse curves 28, section 26 must stretch somewhat to lie tight against section 27 and consequently any wrinkling or overlapping of section 26 which might interfere with a complete closure of the valve is avoided.

In use the herein-described valve structure is mounted in the desired material-handling equipment or material-handling line by coupling the flanged end portions 9 and 10 of the rigid housing to flanges provided in the ends of the sections of the material-handling line or structure in which the valve is to be used, the flared ends 20 and 21 of the flexible lining being held between the flanges of the valve housing and the flanges of the two sections thusly coupled by the valve housing. The inlet 17 is then connected to a source of hydraulic or pneumatic compressant, such as a high pressure water line or a source of compressed air, provided with any type of conventional cut-off valve. The lining of the present valve structure with no compressant introduced through the inlet 17 remains in the open position shown in Figure 3 so that the material-conveying line in which the valve is mounted is free to carry a full flow of material without obstruction or interference by the valve structure. Flow of material through the valve and line can be stopped by opening the valve in the compressant line and introducing the fluid compressant under pressure through inlet 17 into the space between lining section 26 and housing section 7 to collapse the lining section 26 against section 27, as shown in Figure 2, thereby cutting off effectively and quickly the flow of material through the line.

Having described the present invention in detail, it is desired to claim:

1. A pneumatic valve comprising a flexible collapsible, generally tubular conduit member outwardly flanged at the ends and having two lengthwise exterior flanges on diametrically opposite sides of said conduit member, a housing enclosing said conduit member, said housing comprising two semi-cylindrical sections flanged outwardly at the two ends for mounting with the flanged ends of the aforesaid flexible conduit in a material-conveying line, and flanged lengthwise at both edges, and means for securing said semi-cylindrical sections together encasing said conduit member with the lengthwise flanges thereof between the lengthwise flanges of the housing, and inlet means in one of said semi-cylindrical sections for admitting a fluid compressant under pressure into an expansible chamber defined by the housing and the conduit member to close the latter by collapsing one semi-cylindrical wall thereof against the opposing, stationary wall thereof, the collapsible semi-cylindrical section of the flexible conduit having a diameter when the valve is in a fully open position less than the diameter of the opposing, stationary, semi-cylindrical wall of the conduit whereby the collapsible section must stretch to lie tight against the stationary wall when the valve is in closed position.

2. A pneumatic valve comprising a tubular housing constructed of two hollow semi-cylindrical sections flanged at the ends for mounting in a pipe line, and flanged lengthwise at the two edges, and an elastic, flexible tubular lining having diametrically opposed, outwardly extending lengthwise flanges secured between the lengthwise flanges of said housing, and inlet means in one section of the housing for introducing fluid under pressure into an expansible chamber defined by the housing and the tubular lining to collapse one side of said tubular lining against the other side of the lining, the collapsible semi-cylindrical side of the flexible lining having a diameter when the valve is in the fully open position less than the diameter of the opposing, stationary, semi-cylindrical wall of the lining whereby the collapsible side must stretch to lie tight against the stationary wall when the valve is in closed position.

References Cited in the file of this patent

UNITED STATES PATENTS

| | | |
|---|---|---|
| 2,615,668 | Ernest | Oct. 28, 1952 |
| 2,633,154 | Eastman | Mar. 31, 1953 |

FOREIGN PATENTS

| | | |
|---|---|---|
| 504,449 | Germany | 1930 |
| 801,959 | Germany | 1951 |